United States Patent
Taylor

(10) Patent No.: US 10,469,593 B2
(45) Date of Patent: Nov. 5, 2019

(54) METHOD AND SYSTEM FOR SHARDED RESOURCE BROKERING

(71) Applicant: VMware, Inc., Palo Alto, CA (US)

(72) Inventor: Frank S. Taylor, Hertfordshire (GB)

(73) Assignee: VMware, Inc., Palo Alto, CA (US)

(*) Notice: Subject to any disclaimer, the term of this patent is extended or adjusted under 35 U.S.C. 154(b) by 1107 days.

(21) Appl. No.: 13/658,399

(22) Filed: Oct. 23, 2012

(65) Prior Publication Data
US 2014/0115028 A1  Apr. 24, 2014

(51) Int. Cl.
*H04L 29/08* (2006.01)
*G06Q 10/10* (2012.01)
*H04L 12/18* (2006.01)

(52) U.S. Cl.
CPC .......... *H04L 67/141* (2013.01); *G06Q 10/10* (2013.01); *H04L 12/1818* (2013.01); *H04L 67/1004* (2013.01); *H04L 67/28* (2013.01)

(58) Field of Classification Search
CPC ............ H04L 67/141; H04L 12/1818; H04L 67/1004; H04L 67/28; H04L 67/00; G06Q 10/10
USPC .......................................................... 709/202
See application file for complete search history.

(56) References Cited

U.S. PATENT DOCUMENTS

| 8,010,676 | B1 | 8/2011 | Battersby | |
|---|---|---|---|---|
| 8,370,510 | B2* | 2/2013 | London | G06F 9/4445 707/781 |
| 8,413,144 | B1* | 4/2013 | Manmohan | G06F 11/301 714/1 |
| 9,152,302 | B2* | 10/2015 | Pizurica | H04L 67/36 |
| 2009/0248869 | A1* | 10/2009 | Ghostine | H04W 8/30 709/225 |
| 2012/0096461 | A1* | 4/2012 | Goswami | G06F 9/45558 718/1 |
| 2013/0067345 | A1* | 3/2013 | Das | G06F 8/63 715/740 |

* cited by examiner

*Primary Examiner* — Esther B. Henderson
*Assistant Examiner* — Nazia Naoreen
(74) *Attorney, Agent, or Firm* — Fish & Richardson P.C.

(57) ABSTRACT

This disclosure describes a virtual desktop brokering system that brokers a virtual desktop session. During operation, a broker receives a request to establish the session. Next, the broker broadcasts, to a set of agent concentrators, a request to find an available machine for the session, wherein each agent concentrator maintains state information of a respective group of available machines. The broker receives, from at least one agent concentrator, a list of available machines. Subsequently, the broker chooses an available machine from the list for the session, and the broker sends a request to the agent concentrator associated with the chosen machine to initiate the session.

13 Claims, 8 Drawing Sheets

METHOD AND SYSTEM FOR SHARDED RESOURCE BROKERING

BACKGROUND

As virtualization technology continues to mature, an increasing number of enterprises deploy virtualization platforms to provide virtual desktops residing in the cloud. A virtual desktop is a desktop operating system running inside a virtual machine that resides in a physical server. The desktop components are decoupled from the physical servers and delivered as a managed service from a centralized location such as a datacenter or from the cloud. End users can access these virtual desktops from client machines. An enterprise's information technology administrator can virtualize operating system, applications, and user data to securely deliver virtual desktops as a service to the users. Users can access their virtual desktops from any location when needed.

In virtual desktop infrastructure (VDI) deployments, a connection broker establishes virtual desktop sessions between users and virtual machines executing in the cloud. Typically, a cluster of connection brokers serve a large number of virtual machines. These connection brokers may be implemented in a monolithic shared-everything architecture. For example, in the VMware View® VDI system, the connection brokers replicate virtual machine state information amongst themselves so that any given connection broker maintains complete state information of all the virtual machines and can connect a user with any available virtual machine.

A VDI system may need to scale its service capacity to meet increasing customer demands. Some organizations may require highly scalable deployments (e.g., above ten thousand desktops). Such organizations may eventually need to deploy more than a million desktops. The monolithic shared-everything architecture may present a scalability bottleneck as the number of deployments approaches ten thousand virtual desktops. Various approaches to handle larger loads include attempts to improve an individual cluster's scalability and linking or federating clusters of connection brokers. Unfortunately, such approaches require complex configurations that provide only marginal or limited improvements in scalability and are insufficiently effective for scaling the service capacity to the required high levels.

SUMMARY

A virtual desktop brokering system is provided to broker a virtual desktop session. During operation, a broker receives a request to establish the session. Next, the broker broadcasts, to a set of agent concentrators, a request to find an available machine for the session, wherein each agent concentrator maintains state information of a respective group of available machines. The broker receives, from at least one agent concentrator, a list of available machines. Subsequently, the broker chooses an available machine from the list for the session, and the broker sends a request to the agent concentrator associated with the chosen machine to initiate the session.

DETAILED DESCRIPTION

Figure 1A:
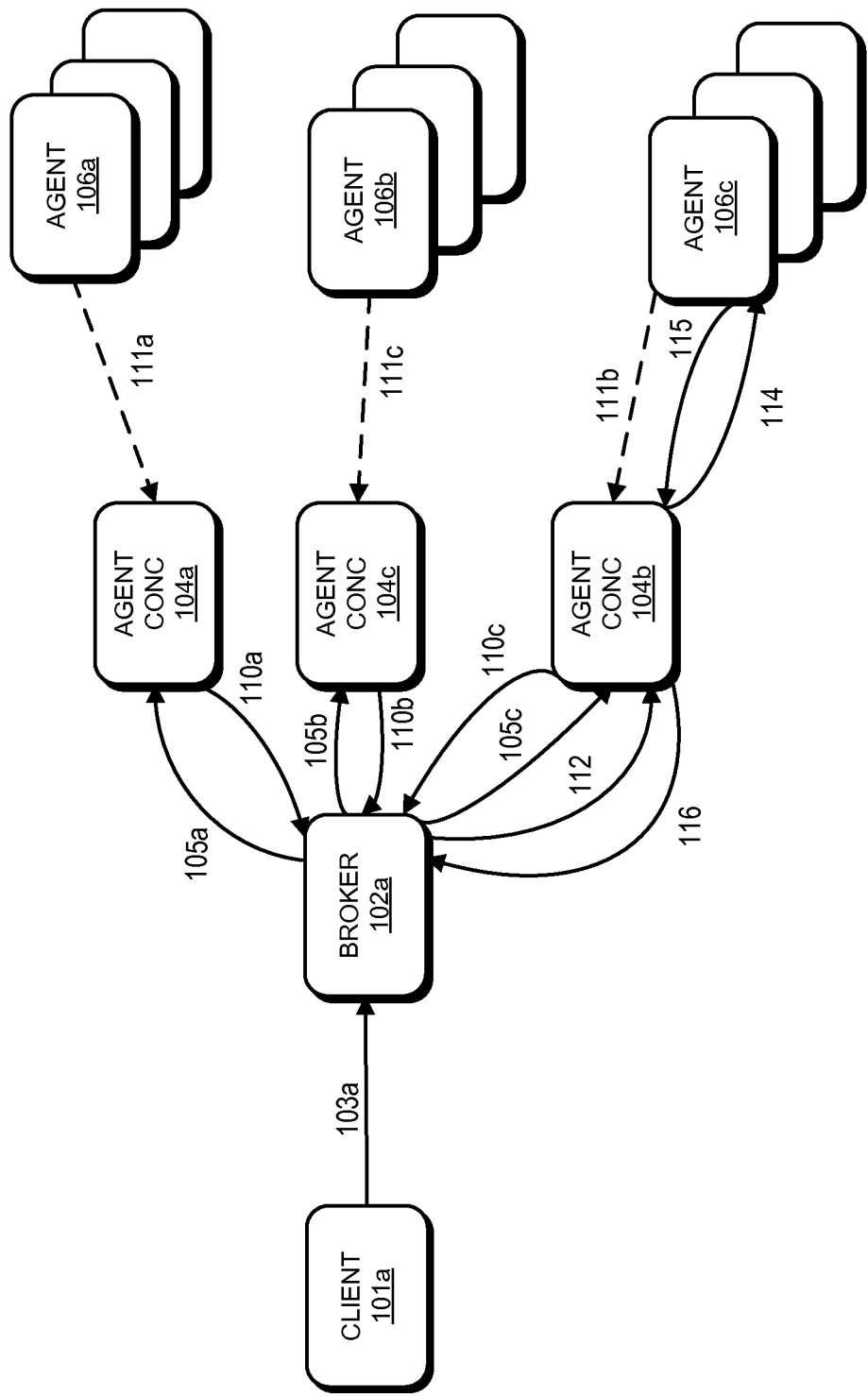
FIG. 1A presents a block diagram of a VDI deployment for illustrating an exemplary process for negotiating for a new session for a client.

Various modifications to the embodiments described below will be readily apparent to those skilled in the art, and the general principles defined herein may be applied to other embodiments and applications without departing from the spirit and scope of the present disclosure. The present invention is therefore not limited to the embodiments described.

This disclosure describes a system that solves the problem of deploying a highly scalable virtual desktop infrastructure by dividing, among multiple state information concentrators (called "agent concentrators"), the task of tracking virtual machine state, and splitting the task of brokering user sessions and tracking virtual machines into separate tiers that can be scaled independently.

In particular, a connection broker is no longer required to maintain the complete state information for all the virtual machines. Instead, multiple agent concentrators are responsible for maintaining state information of only their respective set of virtual machines. By adopting this shared-nothing virtualization architecture, the system can scale to broker more than one million desktops.

In this system, a broker receives from a client a virtual session request to connect to a virtual desktop. In response, the broker issues requests to all the agent concentrators to locate an existing session or negotiate a new session on a virtual machine. Each agent concentrator then searches through its respective stored state information for available virtual machines. The broker then combines the search results from the agent concentrators and chooses an available virtual machine for the client.

Each virtual machine has a software agent that communicates with an agent concentrator to report the virtual machine's state information and respond to service requests. The system divides the agent data (e.g., virtual machine state information) into data subsets. Each subset of data is called a shard. Agents running on the virtual machines contribute to the shards of virtual machine state information stored at the agent concentrators. When an agent concentrator receives a request from the broker to search for available virtual machines, the agent concentrator searches through its sharded data in parallel with other agent concentrators. This parallel search mechanism across sharded state data allows the virtualization platform to accommodate a large number of virtual machines, and forms part of a sharded resource broker architecture.

Furthermore, because the system assigns the tasks of brokering virtual session requests and managing agent state information to two separately scalable groups, namely, the brokers and agent concentrators, the system can scale each of the groups independently to increase the service capacity. The system can increase the number of brokers to handle greater numbers of client requests and/or user sessions. The system can also increase the number of agent concentrators to handle greater numbers of virtual machines. Hence, the system can scale the service capacity to handle an almost indefinite number of users and/or virtual machines.

FIG. 1A presents a block diagram of a VDI deployment for illustrating an exemplary process for negotiating for a new session for a client. In this example, there are two phases to negotiating a virtual desktop session. The first phase is to determine the virtual machines that are available. The second phase is to choose and book a virtual machine.

As illustrated in FIG. 1A, a number of agent concentrators (104a, 104b, and 104c) are responsible for maintaining state information for all the virtual machines (not shown). Each virtual machine has a software agent, such as agents 106a, 106b, and 106c, to communicate the virtual machine's state information to an agent concentrator. Thus, in the Figures, each of Agents 106a, 106b, 106c, represents an agent application running on a respective virtual machine (not shown), and each of the virtual machines reside on one or more physical computer systems (not shown), referred to as "hosts." Broker 102a, and agent concentrators 140a, 104b, 104c are likewise applications running on respective virtual or physical computer machines. Client 101a resides in proximity to a user seeking to access resources of one of the virtual machines represented by agents 106a, 106b, 106c. All components are in electronic communication via networking components (not shown). A respective agent concentrator is associated with a particular subset of agents, and an agent's association with agent concentrators can change dynamically. Hence, the state information of all the virtual machines is sharded among the agent concentrators.

One or more brokers (in this example, one broker 102a is in operation) communicate with all the agent concentrators to determine an available virtual machine for a user. Initially, broker 102a receives a request to start a virtual desktop session from a user at a client 101a (operation 103a). Client 101a can be any device that users operate to access virtual desktops, including desktop clients (e.g., Windows®, Mac®, and Linux clients), thin clients or mobile devices (e.g., iOS® or Android® mobile clients).

In response to the request, broker 102a broadcasts a request (e.g., a FIND-MACHINE request) to all agent concentrators (operations 105a, 105b, and 105c). Agent concentrators 104a, 104b, and 104c each search its stored virtual machine state information to identify one or more available virtual machines. Note that the agent concentrators receive virtual machine state information from the respective agents (shown as dashed lines 111a, 111b, and 111c in FIG. 1A). Subsequently, each of agent concentrators 104a-104c processes the brokering requests and returns a list of available virtual machines (e.g., machines with respective agents 106a, 106b, and 106c) to broker 102a (operations 110a, 110b, and 110c).

In one embodiment, each agent concentrator constructs a list of available virtual machines based on data regarding all virtual machines that are dynamically coupled to that particular agent concentrator. Then, broker 102a merges all replies received from agent concentrators 104a, 104b, and 104c to generate an aggregate list of available virtual machines. Note that broker 102a does not need to maintain any virtual machine state information. Furthermore, if desktop virtual machines are assigned to specific users in a one-to-one assignment, then only one agent concentrator returns a response with an available virtual machine, because only one virtual machine is assigned to that user and can therefore satisfy that request.

Next, broker 102a chooses a virtual machine for the new session. Broker 102a may use any technique to choose a virtual machine, including randomly picking an available virtual machine. After choosing the virtual machine, broker 102a sends a request to establish a desktop connection (e.g., a CONNECT-DESKTOP request) to the agent concentrator handling the chosen virtual machine. For example, broker 102a may send a CONNECT-DESKTOP request to agent concentrator 104b (operation 112). Agent concentrator 104b responds to the request by sending a message (e.g., a START-SESSION message) to agent 106c to book a session (operation 114). Subsequently, agent concentrator 104b receives a response from agent 106c (operation 115), and returns the agent's response to the broker 102a (operation 116).

In addition, agent concentrator 104b may confirm the session booking and successful initiation of the virtual desktop session. If the booking is not successful, broker 102a can send a new request to an agent concentrator to book a session with another virtual machine. In some embodiments, broker 102a can send a connection endpoint (such as an IP address) to client 101a so that client 101a can connect to a virtual machine directly.

As described above, broker 102a dispatches requests from clients to agent concentrators to find available virtual machines, and does not store any virtual machine state information. In addition, broker 102a manages the tasks of user authentication, brokering coordination, and network connectivity. In some embodiments, the system can provide multiple brokers (discussed below with reference to FIG. 1C). Multiple brokers need not exchange agent state to handle an increasing number of clients.

Agent concentrators 104a-104c track the state of the virtual machines (e.g., availability, sessions, etc.) by exchanging messages with the agents of the virtual machines in their respective virtual machine pool subsets. Note that pools are groups of virtual machines organized to facilitate management of the virtual machines (e.g., assignment of virtual machine to users). Each agent concentrator stores, within high-speed memory, data regarding the current state of virtual machines associated with that agent concentrator. Agent concentrators 104a-104c also do not exchange data with each other, thereby avoiding message exchange explosion as the number of agent concentrators grows.

In one embodiment, agents 106a-106c are each configured with a list of all agent concentrators and each agent couples to a randomly chosen agent concentrator upon startup. (An administrator and/or an agent concentrator list management module, either stand-alone or residing in one of the agent concentrators (not shown) can push updated lists of agent concentrators to the agents. Each agent then updates its associated agent concentrator with the state of the agent's corresponding virtual machine. The agent can send the virtual machine update information between random and/or regular intervals, or in response to requests for virtual machine status from an agent concentrator. When an agent concentrator fails, an affected agent can automatically couple to a different agent concentrator. This mechanism provides for load-balancing and automatic failover. In addition to agents running on managed virtual machines, the principles and techniques described herein apply equally to agents running on unmanaged physical machines or agents running on a mix of virtual machines and physical machines.

In addition to sharding virtual machine state information, the present system can further scale the service capacity by dividing the system architecture into multiple tiers, which include data/admin, broker, agent concentrator, agent, and pool manager tiers. The system can increase the service capacity by scaling the relevant tiers. For example, the system can scale the broker tier according to the number of concurrent user sessions, and scale the agent concentrator tier according to the number of managed virtual machines.

As discussed earlier, virtual machines can be organized into groups called pools. Note that users may access specific pools as determined by an administrator. There are floating pools and assigned pools. In a floating pool, users are not pre-assigned to a particular virtual machine; the broker may choose any available virtual machine in a floating pool to host a user session. Once a user's session finishes, that virtual machine can be allocated to another user. In an assigned pool, users are pre-assigned to a virtual machine and the broker always reconnects the user to that virtual machine.

Figure 1B:
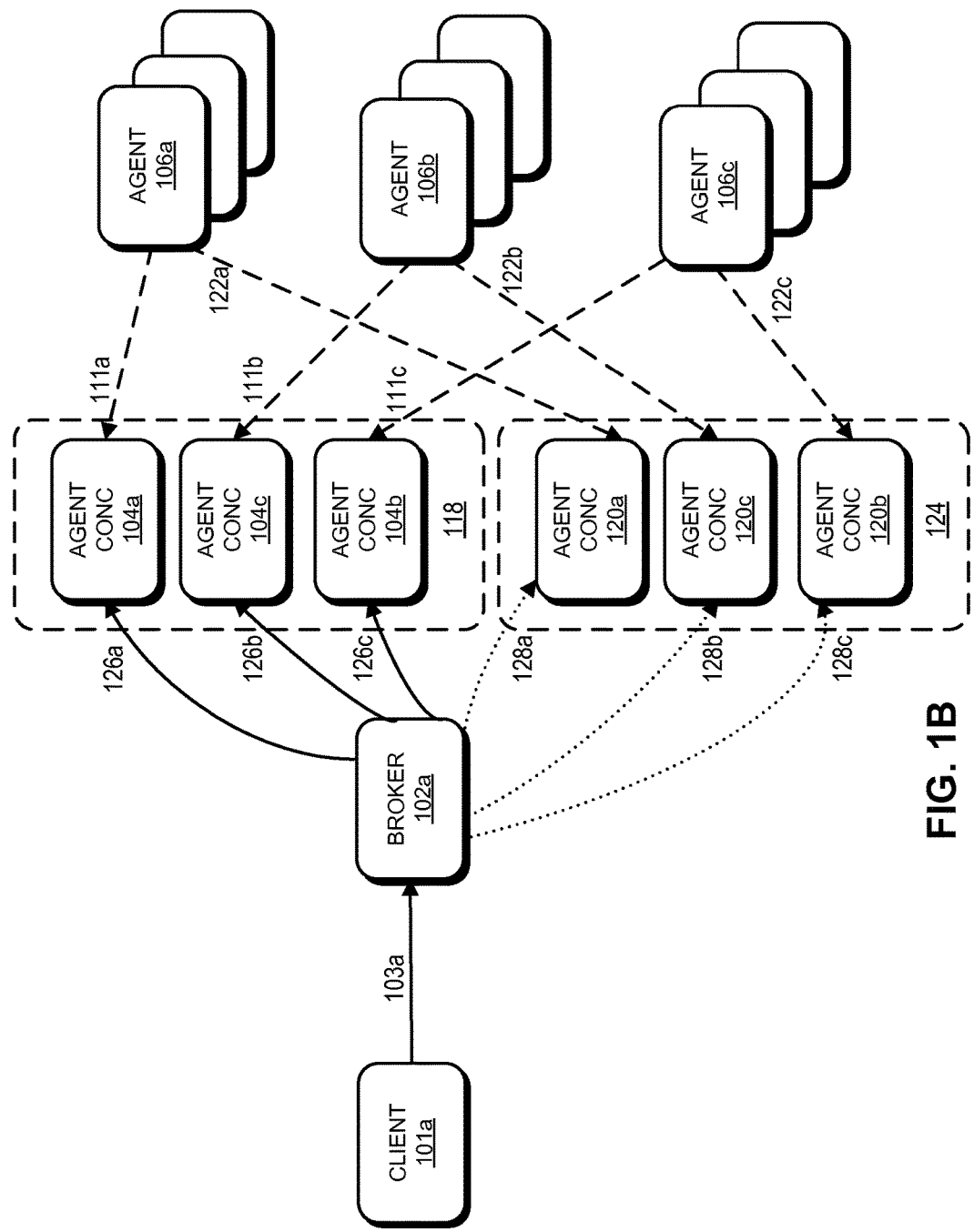
FIG. 1B presents a block diagram of an exemplary VDI deployment for illustrating an exemplary process for brokering a new session using multiple agent concentrator groups.

FIG. 1B presents a block diagram of an exemplary VDI deployment for illustrating an exemplary process for brokering a new session using multiple agent concentrator groups. In some implementations, brokers can load-balance session requests across multiple agent concentrator groups (e.g., agent concentrator groups 118 and 124). An agent concentrator group includes multiple agent concentrators. Agent concentrator group 118 includes agent concentrators 104a, 104b, and 104c. Agent concentrator group 124 includes agent concentrators 120a, 120b, and 120c. The groups mirror each other's agent information.

In the illustrated configuration, each agent 106a, 106b, and 106c couples to one agent concentrator from each group. Dashed lines 111a and 122a illustrate the coupling between agent 106a and agent concentrator 104a and 120a. Similarly, dashed lines 111b and 122b illustrate the coupling between agent 106b and agent concentrator 104c and 120c, and dashed lines 111c and 122c illustrate the coupling between agent 104b and agent concentrator 120b. Note that in this configuration, the agent concentrators handle substantially the same volume of virtual machine state data.

In the illustrated example, with two agent concentrator groups, the number of requests to each agent concentrator from broker 102a can be reduced by half. Initially, broker 102a receives a request to start a virtual desktop session from client 101a (operation 103a). Broker 102a then broadcasts a request (e.g., a FIND-MACHINE request) to all agent concentrators in one of the two agent concentrator groups (operations 126a, 126b, 126c to group 118 or operations 128a, 128b, 128c to group 124). Broker 102a may use different techniques to select between broadcasting to agent concentrator group 118 and agent concentrator group 124. For example, broker 102a may alternate between the two groups, or may randomly choose between one of the two groups. The agent concentrators then reply with information regarding available machines. Note that this configuration improves brokering performance and can increase the service capacity by increasing throughput of brokering requests.

Figure 1C:
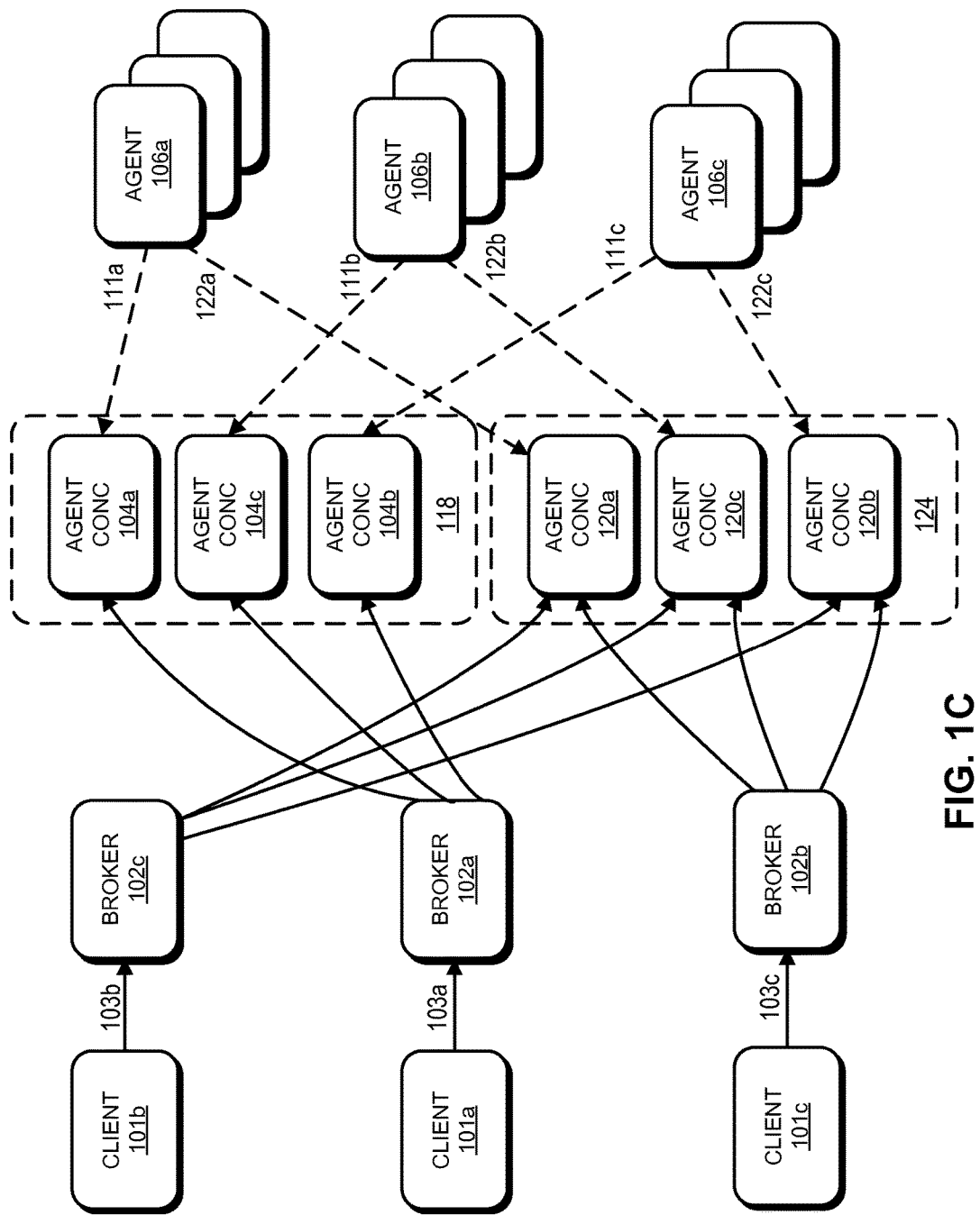
FIG. 1C presents a block diagram of an exemplary VDI deployment for illustrating an exemplary process for load-balancing requests for virtual desktops among multiple brokers.

FIG. 1C presents a block diagram of an exemplary VDI deployment for illustrating an exemplary process for load-balancing requests for virtual desktops among multiple brokers. The system can load-balance user requests for virtual desktops to different brokers, such as brokers 102a, 102b, and 102c. Agent concentrators may receive queries from different brokers, with each broker issuing a query against all associated agent concentrators of one of the agent concentrator groups to find an available virtual machine.

Clients 101a, 101b, and 101c can randomly select a broker to send the request to establish a desktop session (operations 103a, 103b, and 103c). In some embodiments, clients can also send the requests to a load-balancing component (not depicted), and the load-balancing component can forward the requests to a randomly (or otherwise) selected broker to process the session request. The brokers broadcast a request (e.g., a FIND-MACHINE request) to all agent concentrators in one of the two agent concentrator groups. In FIG. 1C, the solid arrows between brokers and agent concentrators illustrate the potential requests from the brokers to the agent concentrators. Note that although FIG. 1C illustrates requests sent between each broker and one group of agent concentrators, the brokers can also send requests to the other group of agent concentrators. As discussed with respect to FIG. 1B, each broker may alternate the requests between the two groups (or rotate requests when there are more than two groups) of agent concentrators or randomly select an agent concentrator group. With the additional brokers, the system can further increase service capacity to handle greater numbers of desktop session requests.

Figure 2:
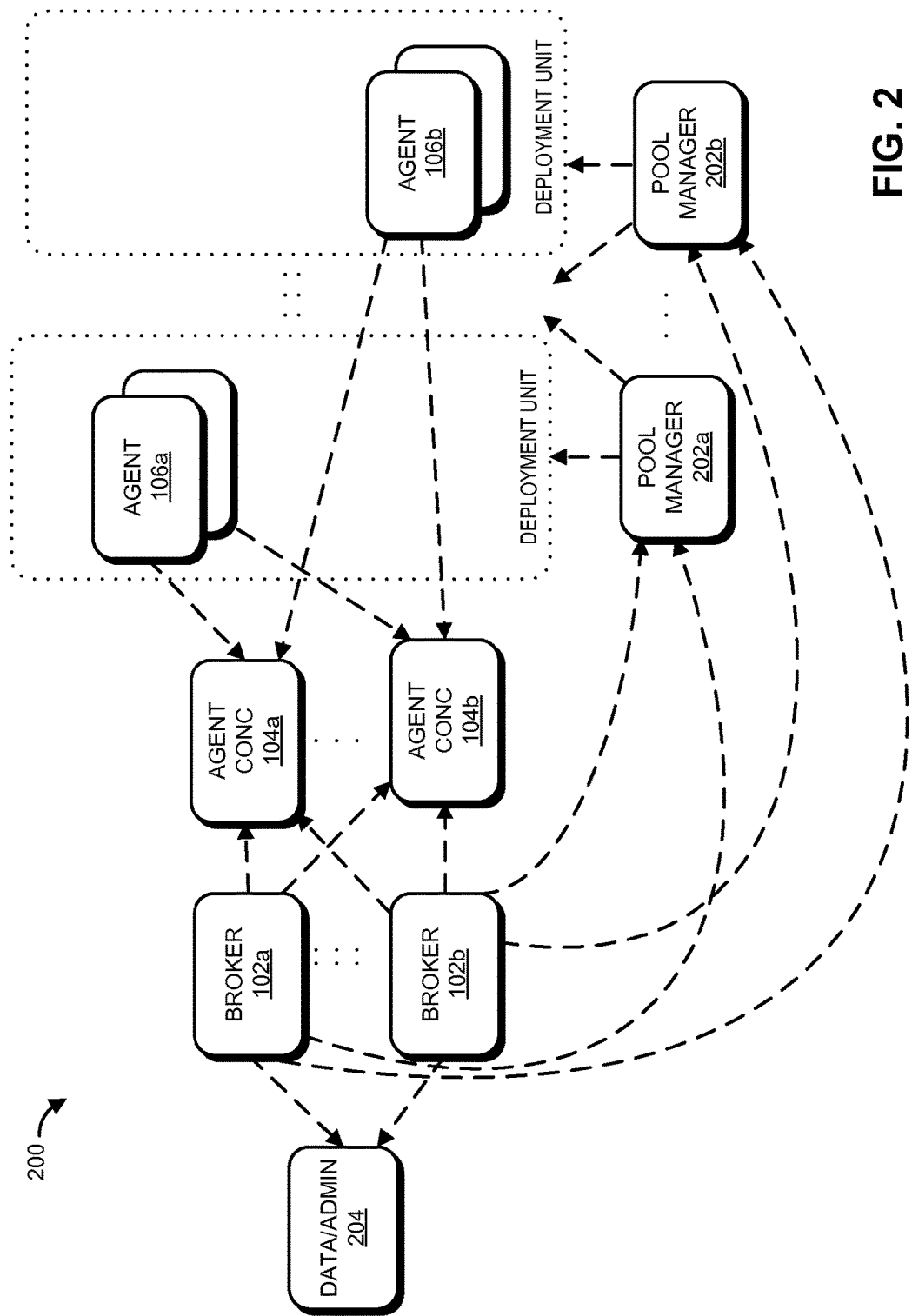
FIG. 2 presents a diagram illustrating the tiers in an exemplary highly scalable virtual machine brokering system.

FIG. 2 presents a diagram illustrating the tiers in an exemplary highly scalable virtual machine brokering system 200. In this example, pool managers 202a-202b manage the lifecycle of virtual machine pools (e.g., provisioning, power management and virtual machine maintenance). Brokers 102a-102b communicate with pool managers 202a-202b to initiate lifecycle operations on virtual machines. For example, the brokers can send instructions to a pool manager to make an assigned virtual machine available (e.g., resume a managed virtual machine). The system can scale the number of pool managers according to the number of managed virtual machines. With either type of pool, brokers can also use data shards stored on different pool managers to connect users with virtual machines in a highly scalable manner. In various implementations, brokers can initiate lifecycle operations on virtual machines by simultaneously communicating with multiple pool managers in the same manner as described above with respect to the communications with agent concentrators.

A data/admin tier 204 stores static environment configuration data, including pool definitions, user entitlements (e.g., user permission to access specific pools), and applicable policies. Various implementations may utilize any storage and distribution technology to implement the data/admin tier (e.g. replicated Lightweight Directory Access Protocol (LDAP) or GemFire®). The data/admin tier also provides the administrative capabilities to control environmental settings.

Figure 3:
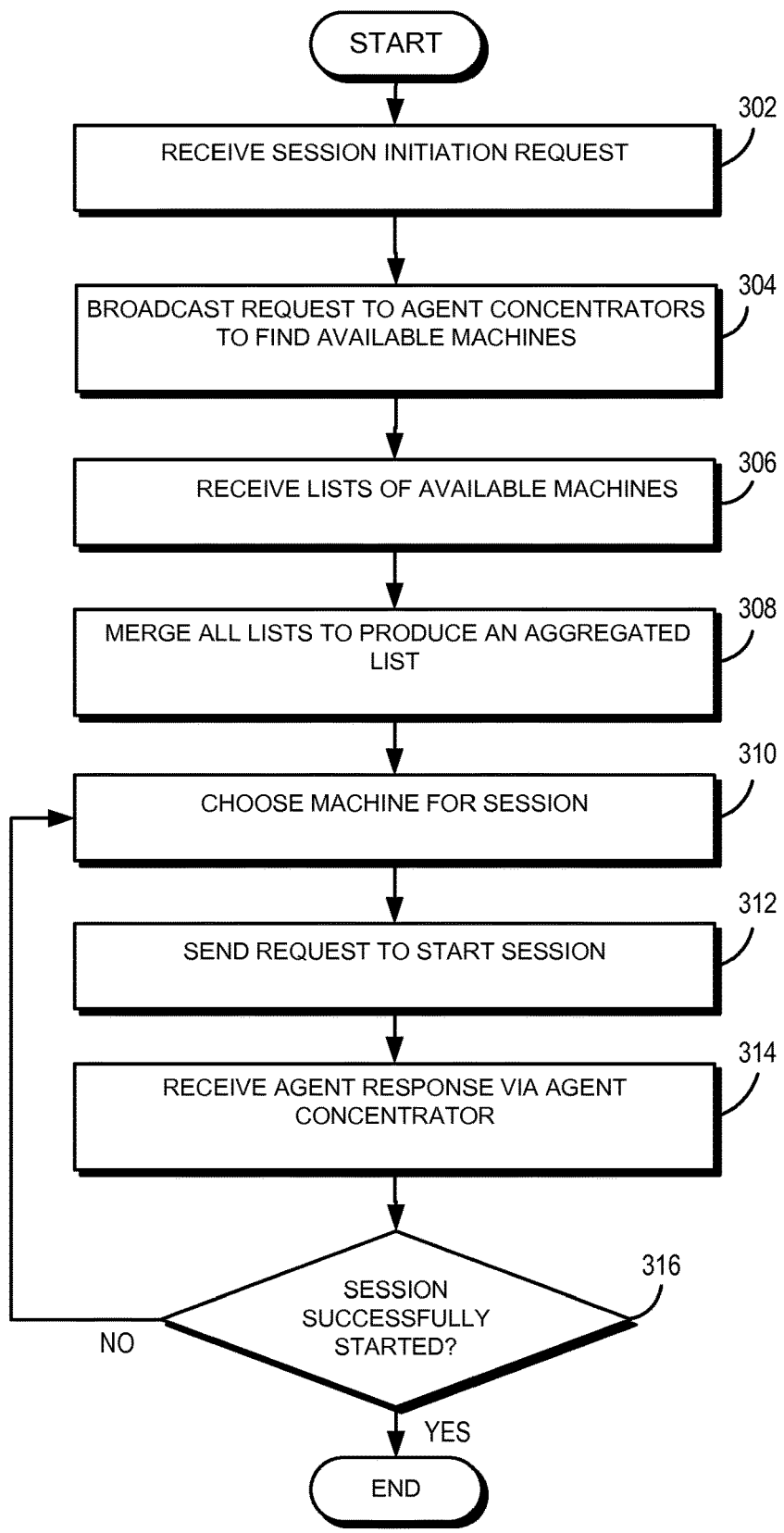
FIG. 3 presents a flowchart illustrating an exemplary process performed by a broker to start a new session.

FIG. 3 presents a flowchart illustrating an exemplary process performed by a broker (e.g., broker 102a) to start a new session. During operation, broker 102a receives a session initiation request from client 101a (operation 302). In response, broker 102a broadcasts a request to agent concentrators 104a-104c to find available machines (operation 304). Broker 102a then receives lists of available machines from agent concentrators 104a-104c (operation 306). Next, broker 102a merges all lists to produce an aggregated list (operation 308).

After choosing a machine for the session (operation 310), broker 102*a* sends a request to start the session to the agent concentrator associated with the chosen machine (operation 312). Broker 102*a* subsequently receives, via the agent concentrator, a response from an agent associated with the chosen machine (operation 314). Broker 102*a* then determines whether the session is successfully started (operation 316). If the session is not successfully started on the agent's machine, broker 102*a* chooses another machine (operation 310). Otherwise, the session has been successfully initiated and the session brokering process terminates for the current request.

Figure 4A:
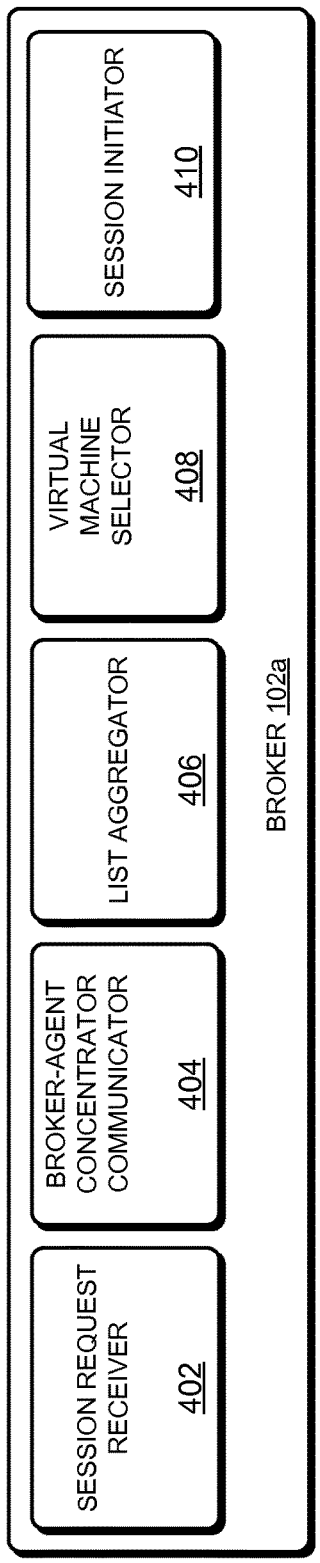
FIG. 4A presents a diagram illustrating an exemplary broker.

FIG. 4A presents a diagram illustrating exemplary broker 102*a*. In FIG. 4A, broker 102*a* includes a session request receiver 402, a broker-agent concentrator communicator 404, a list aggregator 406, a virtual machine selector 408, and a session initiator 410. Session request receiver 402 receives requests to start virtual desktop sessions from clients. Broker-agent concentrator communicator 404 communicates with agent concentrators to request and receive information regarding available virtual machines. List aggregator 406 merges information received from agent concentrators to generate an aggregate list of available virtual machines. Machine selector 408 may use any technique to choose a virtual machine for a virtual desktop session. For example, machine selector 408 may randomly choose an available virtual machine. Session initiator 410 sends a request to establish a desktop connection to the agent concentrator handling the chosen virtual machine.

Figure 4B:
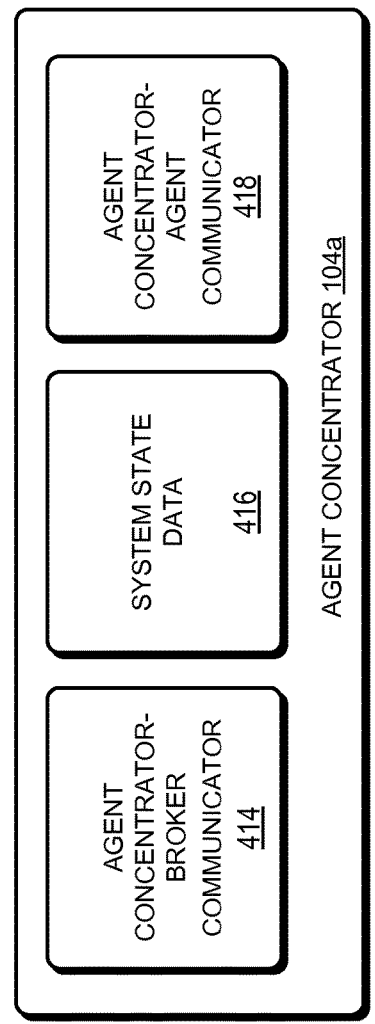
FIG. 4B presents a diagram illustrating an exemplary agent concentrator.

FIG. 4B presents a diagram illustrating exemplary agent concentrator 104*a*. In FIG. 4B, agent concentrator 104*a* includes an agent concentrator-broker communicator 414, system state data 416, and agent concentrator-agent communicator 418. Agent concentrator-broker communicator 414 sends virtual machine availability information to brokers (e.g., broker 102*a*). Agent concentrator 104*a* stores virtual machine state information (e.g., system state data 416) in high-speed memory. Agent concentrator-agent communicator 418 sends messages (e.g., a START-SESSION message) to agents and receives virtual machine state information from agents.

Figure 4C:
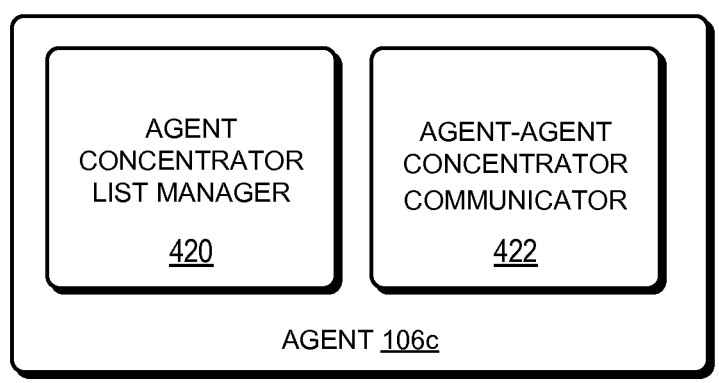
FIG. 4C presents a diagram illustrating an exemplary agent.

FIG. 4C presents a diagram illustrating exemplary agent 106*c*. In FIG. 4C, agent 106*c* includes an agent concentrator list manager 420, and an agent-agent concentrator communicator 422. Agent concentrator list manager 420 manages and stores a list of agent concentrators that agent 106*c* may couple with. Agent-agent concentrator communicator 422 sends messages (e.g., virtual machine availability information) to a coupled agent concentrator.

Figure 5:
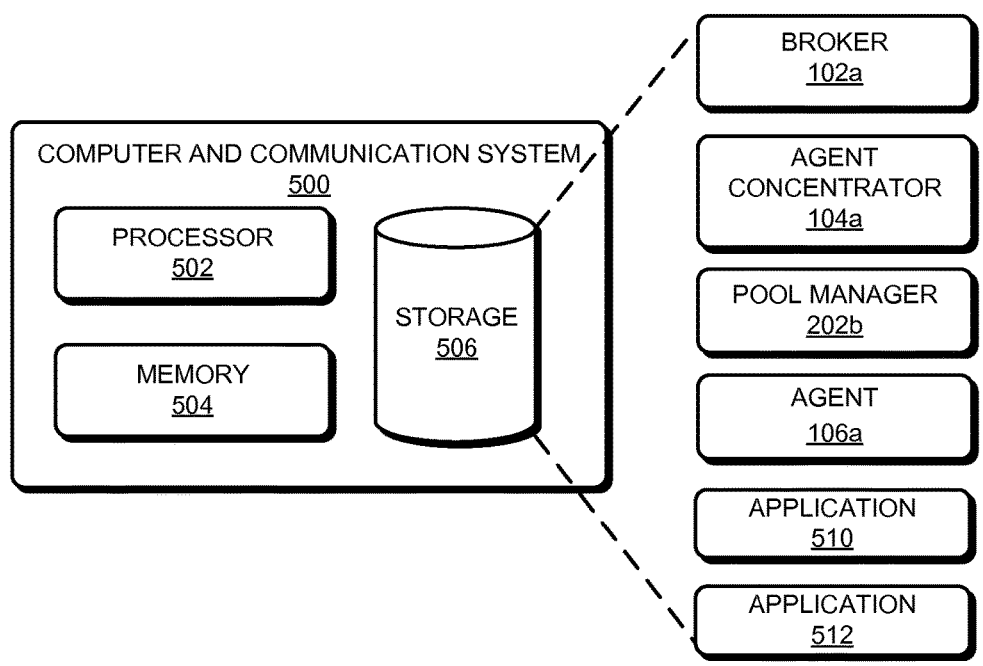
FIG. 5 presents a diagram illustrating an exemplary system for implementing a sharded resource broker architecture.

FIG. 5 presents a diagram illustrating an exemplary system for implementing a sharded resource broker architecture. In one embodiment, a computer and communication system 500 includes a processor 502, a memory 504, and a storage device 506. In one embodiment, computer and communication system 500 is implemented as a virtual machine, in which case processor 502, memory 504 and storage 506 are implemented as a virtual process, virtual memory, and virtual storage, respectively. Storage device 506 stores instructions that implement one or more components of the sharded resource broker architecture (e.g., broker 102*a*, agent concentrator 104*a*, pool manager 202*b*, and agent 106*a*). Storage device 506 can also store other applications, such as applications 510 and 512. The various components are loaded from storage device 506 into memory 504 and then executed by processor 502. While executing the program, processor 502 performs the aforementioned functions. Although computer and communication system 500 may be optionally coupled to a display, keyboard, and pointing device, computer and communication system 500 is usually managed remotely, obviating the need for locally attached human interface devices.

Note that the above-mentioned components can be implemented in hardware as well as in software. In some embodiments, one or more of these components can be embodied in computer-executable instructions stored in a memory which is coupled to one or more processors in system 500. When executed, these instructions cause the processor(s) to perform the aforementioned functions.

The data structures and code described in this detailed description can be stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing description has been presented for purposes of illustration and description only. They are not intended to be exhaustive or limiting. Accordingly, many modifications and variations will be apparent to practitioners skilled in the art. The scope of the present invention is defined by the appended claims.

What is claimed is:

1. A method performed by a computing device to broker a virtual desktop session, comprising:
   receiving, at a broker, a request to establish the session from a client device associated with a user;
   determining a first set of agent concentrators of a plurality of sets of agent concentrators;
   broadcasting, from the broker to each agent concentrator of the first set of agent concentrators, a request to find an available virtual machine for the session, wherein each agent concentrator of the first set of agent concentrators maintains state information of a respective group of available virtual machines dynamically assigned to the agent concentrator,
   wherein each agent concentrator of the first set of agent concentrators determines available virtual machines based on obtained state information for a plurality of virtual machines that are dynamically coupled to the agent concentrator, the state information being obtained from each of a plurality of agents, wherein each agent of the plurality of agents is a software agent residing on a respective virtual machine and configured to communicate the virtual machine's state information to a particular agent concentrator, and wherein each virtual machine is assigned to a particular agent concentrator of each of a plurality of sets of agent concentrators according to a selection by the corresponding agent of the virtual machine from the set of available agent concentrators;

receiving, at the broker and from at least one agent concentrator of the first set of agent concentrators, a list of available virtual machines;

choosing, by the broker, an available virtual machine from the list of virtual machines for the requested session; and sending a request to the agent concentrator associated with the chosen virtual machine to initiate the session.

2. The method of claim 1, wherein choosing the virtual machine further comprises:

receiving additional lists of available virtual machines from one or more agent concentrators;

merging all received lists to generate an aggregated list of available virtual machines; and choosing the available virtual machine from the aggregated list.

3. The method of claim 1, further comprising:

receiving a second request to establish a second session;

broadcasting, to a second set of agent concentrators, a request to find an available virtual machine for the second session;

receiving, from at least one agent concentrator of the second set of agent concentrators, a new list of available virtual machines;

choosing a different virtual machine from the new list for the second session; and sending a request to the agent concentrator associated with the chosen different virtual machine to initiate the second session.

4. The method of claim 1, further comprising:

receiving a second request to establish a second virtual desktop session;

broadcasting, to a second set of agent concentrators, a request to find an available virtual machine for the second virtual desktop session, wherein each agent concentrator maintains state information of a respective group of available virtual machines;

receiving, from at least one agent concentrator in the second set of agent concentrators, a second list of available virtual machines;

choosing a second available virtual machine from the second list for the second virtual desktop session; and sending a request to the agent concentrator associated with the second chosen virtual machine to initiate the second virtual desktop session.

5. The method of claim 1, wherein the broker does not maintain state information for the virtual machines.

6. A non-transitory computer-readable storage medium storing instructions that when executed by a computer cause the computer to perform a method to broker a virtual desktop session, the method comprising:

receiving, at a broker, a request to establish the session from a client device associated with a user;

determining a first set of agent concentrators of a plurality of sets of agent concentrators;

broadcasting, from the broker to each agent concentrator of the first set of agent concentrators, a request to find an available virtual machine for the session, wherein each agent concentrator of the first set of agent concentrators maintains state information of a respective group of available virtual machines dynamically assigned to the agent concentrator, wherein each agent concentrator of the first set of agent concentrators determines available virtual machines based on obtained state information for a plurality of virtual machines that are dynamically coupled to the agent concentrator, the state information being obtained from each of a plurality of agents, wherein each agent of the plurality of agents is a software agent residing on a respective virtual machine and configured to communicate the virtual machine's state information to a particular agent concentrator, and wherein each virtual machine is assigned to a particular agent concentrator of each of a plurality of sets of agent concentrators according to a selection by the corresponding agent of the virtual machine from the set of available agent concentrators;

receiving, at the broker and from at least one agent concentrator of the first set of agent concentrators, a list of available virtual machines;

choosing, by the broker, an available virtual machine from the list of virtual machines for the requested session; and sending a request to the agent concentrator associated with the chosen virtual machine to initiate the session.

7. The storage medium of claim 6, wherein choosing the virtual machine further comprises:

receiving additional lists of available virtual machines from one or more agent concentrators;

merging all received lists to generate an aggregated list of available virtual machines; and choosing the available virtual machine from the aggregated list.

8. The storage medium of claim 6, wherein the storage medium stores additional instructions that, when executed by the computer, causes the computer to perform additional steps comprising:

receiving a second request to establish a second session;

broadcasting, to a second set of agent concentrators, a request to find an available virtual machine for the second session;

receiving, from at least one agent concentrator of the second set of agent concentrators, a new list of available virtual machines;

choosing a different virtual machine from the new list for the second session; and sending a request to the agent concentrator associated with the chosen different virtual machine to initiate the second session.

9. The storage medium of claim 6, wherein the storage medium stores additional instructions that, when executed by the computer, causes the computer to perform additional steps comprising:

receiving a second request to establish a second virtual desktop session;

broadcasting, to a second set of agent concentrators, a request to find an available virtual machine for the second virtual desktop session, wherein each agent concentrator maintains state information of a respective group of available virtual machines;

receiving, from at least one agent concentrator in the second set of agent concentrators, a second list of available virtual machines;

choosing a second available virtual machine from the second list for the second virtual desktop session; and sending a request to the agent concentrator associated with the second chosen virtual machine to initiate the second virtual desktop session.

10. A computer system for brokering a virtual desktop session, the computer system comprising a processor and a storage device storing instructions that when executed by the processor cause the processor to perform a method, the method comprising:

receiving, at a broker, a request to establish the session from a client device associated with a user;

determining a first set of agent concentrators of a plurality of sets of agent concentrators;

broadcasting, from the broker to each agent concentrator of the first set of agent concentrators, a request to find an available virtual machine for the session, wherein each agent concentrator of the first set of agent concentrators maintains state information of a respective group of available virtual machines dynamically assigned to the agent concentrator, wherein each agent concentrator of the first set of agent concentrators determines available virtual machines based on obtained state information for a plurality of virtual machines that are dynamically coupled to the agent concentrator, the state information being obtained from each of a plurality of agents, wherein each agent of the plurality of agents is a software agent residing on a respective virtual machine and configured to communicate the virtual machine's state information to a particular agent concentrator, and wherein each virtual machine is assigned to a particular agent concentrator of each of a plurality of sets of agent concentrators according to a selection by the corresponding agent of the virtual machine from the set of available agent concentrators;

receiving, at the broker and from at least one agent concentrator of the first set of agent concentrators, a list of available virtual machines;

choosing, by the broker, an available virtual machine from the list of virtual machines for the requested session; and sending a request to the agent concentrator associated with the chosen virtual machine to initiate the session.

11. The computer system of claim 10, wherein choosing the virtual machine further comprises:

receiving additional lists of available virtual machines from one or more agent concentrators;

merging all received lists to generate an aggregated list of available virtual machines; and choosing the available virtual machine from the aggregated list.

12. The computer system of claim 10, wherein the storage medium stores additional instructions that, when executed by the computer, causes the computer to perform additional steps comprising:

receiving a second request to establish a second session;

broadcasting, to a second set of agent concentrators comprising a second plurality of agent concentrators, a request to find an available virtual machine for the second session;

receiving, from at least one agent concentrator of the second set of agent concentrators, a new list of available virtual machines;

choosing a different virtual machine from the new list for the second session; and sending a request to the agent concentrator associated with the chosen different virtual machine to initiate the second session.

13. The computer system of claim 10, wherein the storage device stores additional instructions that, when executed by the processor, causes the processor to perform additional steps comprising:

receiving a second request to establish a second virtual desktop session;

broadcasting, to a second set of agent concentrators, a request to find an available virtual machine for the second virtual desktop session, wherein each agent concentrator maintains state information of a respective group of available virtual machines;

receiving, from at least one agent concentrator in the second set of agent concentrators, a second list of available virtual machines;

choosing a second available virtual machine from the second list for the second virtual desktop session; and sending a request to the agent concentrator associated with the second chosen virtual machine to initiate the second virtual desktop session.

* * * * *